United States Patent
Yang (10) Patent No.: US 9,332,416 B2
(45) Date of Patent: May 3, 2016

(54) SYSTEM, SERVER AND MOBILE TERMINAL FOR BACKING UP AND RECOVERING DATA

(71) Applicant: HUIZHOU TCL MOBILE COMMUNICATION CO., LTD, Huizhou, Guangdong (CN)

(72) Inventor: Zhibing Yang, Guangdong (CN)

(73) Assignee: HUIZHOU TCL MOBILE COMMUNICATION CO., LTD, Huizhou, Guangdong (CN)

( * ) Notice: Subject to any disclaimer, the term of this patent is extended or adjusted under 35 U.S.C. 154(b) by 0 days.

(21) Appl. No.: 14/386,539

(22) PCT Filed: Mar. 22, 2013

(86) PCT No.: PCT/CN2013/073049
§ 371 (c)(1),
(2) Date: Sep. 19, 2014

(87) PCT Pub. No.: WO2013/170660
PCT Pub. Date: Nov. 21, 2013

(65) Prior Publication Data
US 2015/0072673 A1    Mar. 12, 2015

(30) Foreign Application Priority Data
May 17, 2012  (CN) .......................... 2012 1 0154867

(51) Int. Cl.
*H04W 8/24* (2009.01)
*H04W 8/18* (2009.01)
(Continued)

(52) U.S. Cl.
CPC ............... *H04W 8/18* (2013.01); *G06F 11/00* (2013.01); *G06F 11/1458* (2013.01);
(Continued)

(58) Field of Classification Search
CPC ......... H04W 8/18; H04W 60/00; H04W 8/24; H04W 4/001; H04L 67/1095; H04L 69/04; H04L 41/00; G06F 11/00; G06F 11/1458
See application file for complete search history.

(56) References Cited

U.S. PATENT DOCUMENTS

2005/0050117 A1   3/2005  Seo et al.
2007/0250671 A1*  10/2007 Lyon ................... G06F 11/1453
                                                 711/162

(Continued)

FOREIGN PATENT DOCUMENTS

| CN | 1351292 A | 5/2002 |
| CN | 1351292 A | 5/2002 |
| CN | 1592464 A | 3/2005 |
| CN | 1592464 A | 3/2005 |
| CN | 1787665 A | 6/2006 |
| CN | 1980461 A | 6/2007 |

(Continued)

OTHER PUBLICATIONS

WO 2009072706, Service system for Backup and Restoring data in Mobile Terminal, Jun. 11, 2009, Park, Sung Won.*

*Primary Examiner* — Ted Wang
(74) *Attorney, Agent, or Firm* — Ladas & Parry LLP (57) ABSTRACT

The present disclosure provides a system for backing up and recovering data, which comprises a mobile terminal and a server. The mobile terminal comprises: a parameter backup module, being configured to receive a backup request for backing up system setting parameters of the mobile terminal, and enable the mobile terminal to transmit the system setting parameters to a network server according to the backup request so that the system setting parameters are backed up by the network server; a request-for-recovery module, being configured to receive a recovery request for recovering the system setting parameters to the mobile terminal and enable the mobile terminal to transmit the recovery request to the network server; and a recovery control module, being configured to receive the system setting parameters that are transmitted by the network server according to the recovery request and control to recover a system state of the mobile terminal to a state that is set by the system setting parameters. In this way, the present disclosure can back up the system setting parameters of the mobile terminal to the server, and recover the system setting parameters from the server to the mobile terminal during a data recovery. Thus, the present disclosure brings great convenience and a new experience to users.

6 Claims, 5 Drawing Sheets

(51) Int. Cl.
*H04W 60/00* (2009.01)
*H04L 29/08* (2006.01)
*G06F 11/00* (2006.01)
*H04W 4/00* (2009.01)
*H04L 12/24* (2006.01)
*G06F 11/14* (2006.01)
*H04L 29/06* (2006.01)

(52) U.S. Cl.
CPC .......... *H04L 41/00* (2013.01); *H04L 67/1095* (2013.01); *H04W 4/001* (2013.01); *H04W 60/00* (2013.01); *H04L 69/04* (2013.01); *H04W 8/24* (2013.01)

(56) References Cited

U.S. PATENT DOCUMENTS

| | | | |
|---|---|---|---|
| 2008/0168111 | A1* | 7/2008 | Lyon .................. G06F 11/1453 |
| 2009/0249011 | A1 | 10/2009 | Ohishi |
| 2010/0313199 | A1* | 12/2010 | Chen .................... G06F 9/5055 717/177 |
| 2015/0072673 | A1 | 3/2015 | Yang |

FOREIGN PATENT DOCUMENTS

| | | |
|---|---|---|
| CN | 1980461 A | 10/2009 |
| CN | 102711094 A | 10/2012 |
| CN | 102711094 A | 10/2012 |

* cited by examiner

SYSTEM, SERVER AND MOBILE TERMINAL FOR BACKING UP AND RECOVERING DATA

RELATED APPLICATION

This application is a national phase entry under 35 USC 371 of International Patent Application No. PCT/CN2013/073049 filed on 22 Mar. 2013, which was published on 21 Nov. 2013 with International Publication Number WO 2013/1706601 A1, which claims priority from Chinese Patent Application No. 201210154867.3 filed on 11 May 2012, the disclosures of which are incorporated in their entirety by reference herein.

FIELD OF THE INVENTION

The present disclosure relates to the field of the communications and more particularly to a system, a server and a mobile terminal for backing up and recovering data.

BACKGROUND OF THE INVENTION

Owing to the advancement of science and technologies, mobile terminals such as mobile phones, tablet computers, personal digital assistants (PDAs) are used more and more widely. Especially, the use of smart phones, such as iphone mobile phones, android mobile phones, has become a trend.

As these mobile terminal systems are designed to be intelligent, functions thereof become increasingly powerful and users upgrade these systems more and more frequently. Additionally, as the electronic consumer products are upgraded rapidly, the users update their mobile phones at an increasingly-faster speed. Meanwhile, because of the enhanced communication and cooperation among the users, it is likely that a user might use others' mobile terminals in some cases.

However, there is a problem in the aforesaid cases: in the event that the operating system is re-installed or the original mobile terminal is lost or lent to the others, the user's settings of the system, such as wallpaper, ringtone or voice messages, will be lost and the user has to set the system again after he or she has completed the re-installation of the operating system or after the mobile terminal has been returned. Even worse, some settings cannot be recovered. For example, a beautiful wallpaper that was originally set is lost after the system upgrade; or a user who uses a mobile phone of somebody else makes an alteration on the settings of the mobile phone, but the original user forgets some of the settings after the mobile terminal has been returned. This makes it inconvenient for people to use mobile terminals and is unfavorable for the trend of the intelligentization of the modern mobile terminals.

SUMMARY OF THE INVENTION

A main technical problem to be solved by the present disclosure is to provide a system, a server and a mobile terminal for backing up and recovering data, which can back up system setting parameters of the mobile terminal to the server and recover the system setting parameters from the server to the mobile terminal during recovering the data. Accordingly, the present disclosure can avoid troubles caused by losing the system setting parameters because of replacing or upgrading the mobile terminal, or resetting the system setting parameters.

To solve the aforesaid technical problem, a technical solution adopted by the present disclosure is to provide a mobile terminal. The mobile terminal comprises: a parameter backup module, being configured to receive a backup request for backing up system setting parameters, and transmit a compressed data packet of the system setting parameters to a network server according to the backup request so that the system setting parameters are backed up by the network server; a request-for-recovery module, being configured to receive a recovery request for recovering the system setting parameters to the mobile terminal and transmit the recovery request to the network server; and a recovery control module, being configured to receive the compressed data packet of the system setting parameters transmitted by the network server according to the recovery request and control to recover a system state of the mobile terminal to a state that is set by the system setting parameters.

Preferably, the parameter backup module comprises: a reading unit, being configured to read information of the system setting parameters one by one; a judging unit, being configured to determine whether there is any setting item that has not been backed up among the information of the system setting parameters that are read; a coding unit, being configured to sort and code the system setting parameters that are read but have not been backed up and compress them into a data packet; and a transmitting unit, being configured to transmit the data packet to the network server.

Preferably, the recovery control module comprises: a receiving unit, being configured to receive the compressed data packet of the system setting parameters transmitted from the network server according to the recovery request; a decoding unit, being configured to decode the received data packet to obtain the system setting parameters comprising types and values of setting items; and a saving unit, being configured to perform a system setting operation according to the types of the setting items and save the system setting parameter.

Preferably, the mobile terminal further comprises: a user information control module, being configured to transmit the identity number and password of the user before the backup request is received by the parameter backup module so as to complete a user registration; and being further configured to receive the identity number and password of the user before the recovery request is received by the request-for-recovery module so as to complete a user login.

To solve the aforesaid technical problem, another technical solution adopted by the present disclosure is to provide a server for backing up and recovering data. The server comprises: a communication module, being configured to acquire user identity information from the mobile terminal and establish a corresponding user database; a storage module, being configured to store the user identity information and, according to the user identity information, also store the system setting parameters transmitted from the mobile terminal; and a processing module, being configured to identify the backup/recovery request from the mobile terminal and process the system setting parameters according to the backup/recovery request.

To solve the aforesaid technical problem, yet another technical solution adopted by the present disclosure is to provide a system for backing up and recovering data. The system comprises a mobile terminal and a server. The mobile terminal comprises: a parameter backup module, being configured to receive a backup request for backing up system setting parameters of the mobile terminal, and enable the mobile terminal to transmit the system setting parameters to a network server according to the backup request so that the system setting parameters are backed up by the network server; a request-for-recovery module, being configured to receive a recovery request for recovering the system setting parameters to the mobile terminal and enable the mobile terminal to transmit the recovery request to the network server; a recovery control module, being configured to receive the system setting parameters that are transmitted by the network server according to the recovery request and control to recover a system state of the mobile terminal to a state that is set by the system setting parameters; wherein the parameter backup module comprises: a reading unit, being configured to receive the backup request for backing up the system setting parameters and read information of the system setting parameters one by one according to the backup request; a judging unit, being configured to judge whether there is any setting item that has not been backed up among the information of the system setting parameters that are read; a coding unit, being configured to sort and code the system setting parameters that are read but have not been backed up and compress them into a data packet; a transmitting unit, being configured to transmit the data packet to the network server; the recovery control module comprises: a receiving unit, being configured to receive the compressed data packet of the system setting parameters transmitted from the network server according to the recovery request; a decoding unit, being configured to decode the received data packet to obtain the system setting parameters comprising types and values of setting items; and a saving unit, being configured to perform a system setting operation according to the types of the setting items and save the system setting parameters.

Preferably, the server comprises: a communication module, being configured to acquire user identity information from the mobile terminal and establish a corresponding user database; a storage module, being configured to store the user identity information and also store the system setting parameters transmitted from the mobile terminal according to the user identity information; and a processing module, being configured to identify the backup/recovery request from the mobile terminal and process the system setting parameters according to the backup/recovery request.

Preferably, identifying the backup/recovery request from the mobile terminal and processing the system setting parameters according to the backup/recovery request by the processing module comprises the following steps of: determining whether the request is a backup request or a recovery request firstly after the request from the mobile terminal is received; if the request is a backup request, finding the corresponding user database according to the user information and saving the compressed data packet of the system setting parameters transmitted by the user according to the backup request into the database of the user so as to finish backing up the system setting parameters of the user; if the request is a recovery request, determining whether the request user is a valid user; if the user is a valid user, finding the system setting parameters in the database of the user through matching and then transmitting the compressed data packet of the system setting parameters to the mobile terminal via the network to enable the mobile terminal to finish recovering the system setting parameters; and if the user is not a valid user, enabling the mobile terminal to end the recovery for the system setting parameters.

As compared to the prior art, the benefits of the present disclosure are as follows: by backing up the system setting parameters of the mobile terminal to the server and by recovering the system setting parameters from the server to the mobile terminal when recovering the data, it can avoid the troubles caused by losing the system setting parameters because of replacing or upgrading the mobile terminal and resetting the system setting parameters. Thus, it is very convenient for the user and brings a new experience to the user.

DETAILED DESCRIPTION OF THE INVENTION

Figure 1:
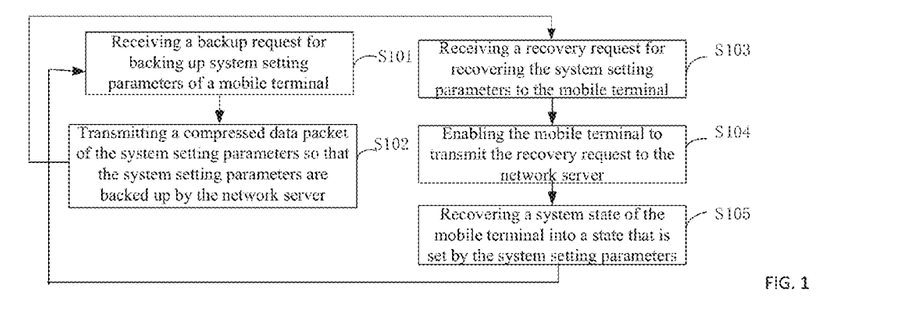
FIG. 1 is a flowchart diagram of an embodiment of a method for data backup and recovery according to the present disclosure.

Referring to FIG. 1, a method for backing up and recovering data according to an embodiment of the present disclosure comprises a data backup stage and a data recovery stage, wherein:

I. The data backup stage comprises:

Step S101: receiving a backup request for backing up system setting parameters of a mobile terminal.

Different users can alter and save the general system setting parameters of the mobile terminal, such as, altering the system setting parameters thereof into ones that are preferred by or suitable for the users. The system setting parameters includes the standby screen, the conversation volume and the type of the ringtone, etc. After the setting is finished, a "backup" option is selected to back up the system setting parameters.

After the "backup" option is selected, a backup request for backing up the system setting parameters of the mobile terminal is generated. Firstly, a "start to back up" request, i.e., the backup request for backing up the system setting parameters of the mobile terminal, is transmitted to a network server. After receiving the backup request of the user, the network server sets a state of the request user to a "start to back up" state and, meanwhile, transmits a "ready" response to the mobile terminal. After receiving the "ready" response, the mobile terminal prepares the system setting parameters that need to be backed up.

Step S102: transmitting a compressed data packet of the system setting parameters so that the system setting parameters are backed up by the network server.

The system setting parameters that need to be backed up in the current system (including the volume and the type of the voice) are compressed by the mobile terminal into a compressed data packet of the system setting parameters and transmitted to the network server. The network server saves the received data packet of the system setting parameters into a corresponding user database to complete the backup.

II. The data recovery stage comprises:

Step S103: receiving a recovery request for recovering the system setting parameters to the mobile terminal.

When the system setting parameters need to be recovered to the mobile terminal, the recovery request for recovering the system setting parameters to the mobile terminal is received, and the recovery request may be generated by a user's operation on the mobile terminal.

Step S104: enabling the mobile terminal to transmit the recovery request to the network server.

The mobile terminal transmits a "start to recover" request to the network server. After receiving the "start to recover" command, the network server finds the system setting parameters that are matched with the user and transmits the system setting parameters to the mobile terminal.

Step S105: recovering a system state of the mobile terminal to a state that is set by the system setting parameters.

The mobile terminal sorts and saves the received system setting parameters according to types of setting items so that the system state of the mobile terminal is recovered into the state that was set by the original system setting parameters to complete the data recovery.

In practical applications, the data backup stage and the data recovery stage may be performed either separately or in a single operation, and the two processes may be performed in any sequence and any limited number of operations. That is, when operations are performed on the mobile terminal, it may be that the system setting parameters are firstly recovered into the state that was originally set, then new system settings are made after recovering the system setting parameters into the state that was originally set, and the new system setting parameters are backed up after the new system settings are finished, and so on.

Figure 2:
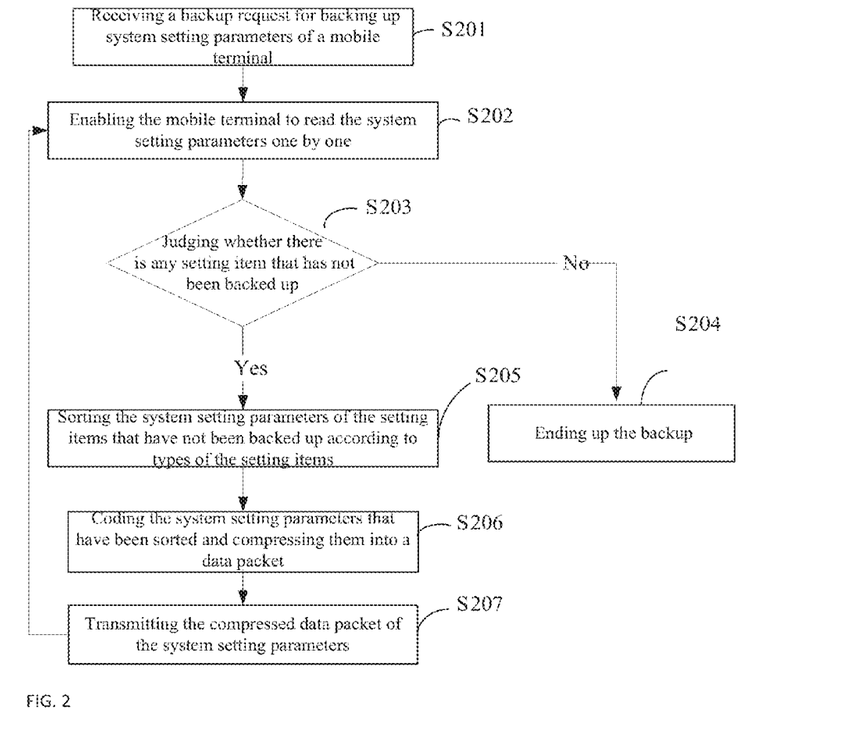
FIG. 2 is a flowchart diagram of an embodiment of a method for data backup according to the present disclosure.

Referring to FIG. 2, in another embodiment of the present disclosure, the data backup stage comprises following steps:

Step S201: receiving a backup request for backing up system setting parameters of a mobile terminal.

The user can alter the general system setting parameters of the mobile terminal according to his/her preferences. After the alteration of the system setting parameters is finished, a "backup" option is selected to back up the system setting parameters.

The mobile terminal transmits the backup request to the network server. The network server receives the backup request of the user and sets a state of the request user to a "start to back up" state and, meanwhile, transmits a "ready" response to the mobile terminal. After receiving the "ready" response, the mobile terminal prepares the system setting parameters that need to be backed up.

Step S202: enabling the mobile terminal to read the system setting parameters one by one.

The mobile terminal reads the system setting parameters in the system respectively, including the volume, the type of the voice, or the like.

Step S203: judging whether there is any setting item that has not been backed up.

The mobile terminal judges whether there is any setting item that has not been backed up in the system setting parameters that are read. If there is a setting item that has not been backed up, step S205 is executed; and if all of setting items have been backed up, step S204 is executed.

Step S204: ending the backup.

If all of the setting items in the system setting parameters have been backed up, the backup process ends up.

Step S205: sorting the system setting parameters of the setting items that have not been backed up according to the types of the setting items.

The mobile terminal sorts the system setting parameters that have not been backed up, and allocates different type names to the system setting parameters. In this way, each of the system setting parameters comprises two kinds of information: type and data. The type name is the same as that of the corresponding system setting parameter in the network server, and this makes it convenient for the mobile terminal and the network server to manage the system setting parameters of the mobile terminal. After being read, each of the parameters is assigned to a corresponding parameter type. For example, the volume value is assigned to a variable of volume type.

Step S206: coding the system setting parameters that have been sorted and compressing them into a data packet.

That is, the system setting parameters are coded into a communication data packet, i.e., a TCP/IP data packet.

Step S207: transmitting the compressed data packet of the system setting parameters.

The mobile terminal transmits the TCP/IP data packet to the network server via the network, and the network server receives, sorts and saves the data packet so as to finish backing up the system setting parameters.

Figure 3:
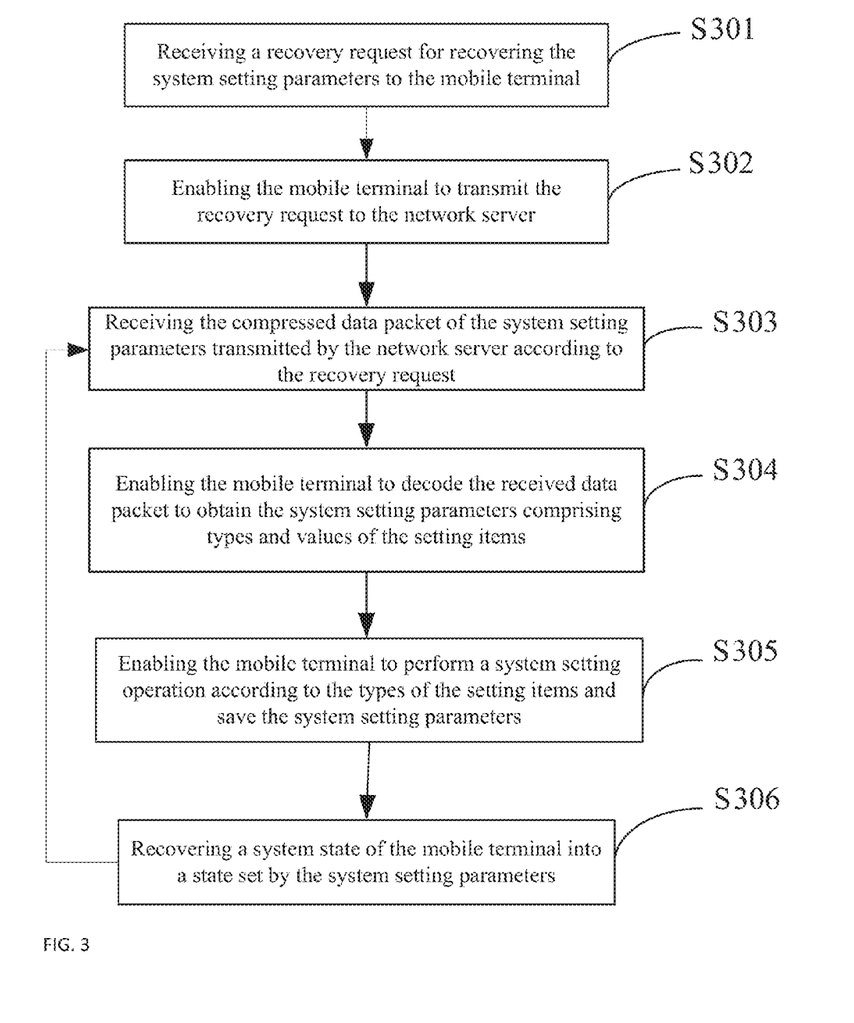
FIG. 3 is a flowchart diagram of an embodiment of a method for data recovery according to the present disclosure.

Referring to FIG. 3, in another embodiment of the present disclosure, the data recovery stage comprises following steps:

Step S301: receiving a recovery request for recovering the system setting parameters to the mobile terminal.

When the mobile terminal needs to recover the system setting parameters, a recovery request for recovering the system setting parameters to the mobile terminal is received.

Step S302: enabling the mobile terminal to transmit the recovery request to the network server.

The mobile terminal transmits a "start to recover" request to the network server. After receiving the "start to recover" command, the network server finds the system setting parameters that are matched with the user and transmits the system setting parameters to the mobile terminal.

Step S303: receiving the compressed data packet of the system setting parameters transmitted from the network server according to the recovery request.

After receiving the recovery request transmitted from the mobile terminal, the network server searches the system setting parameters of the current user in the database. After being found, each of the system setting parameters (comprising the type of the parameter and the data of the parameter) is compressed into a TCP/IP data packet and transmitted to the mobile terminal one by one via the network.

Step S304: decoding the received data packet by the mobile terminal to obtain the system setting parameters comprising types and values of setting items.

The mobile terminal firstly decodes the received data packet, and then analyzes the acquired information of the system setting parameters. The information of the system setting parameters comprises the types and the values of the setting items.

Step S305: enabling the mobile terminal to perform a system setting operation according to the types of the setting items and save the system setting parameters.

The mobile terminal sets the system parameters respectively according to the types of the setting items. For example, the mobile terminal sets the volume according to the variable of volume type, sets the standby picture according to the type of the standby screen, or sets the ringtone according to the type of the ringtone, and so on. After the setting is finished, the system setting parameters are saved locally.

Step S306: recovering a system state of the mobile terminal to a state set by the system setting parameters.

After the mobile terminal performs the system setting operation and saves according to the types of the setting items, the system state of the mobile terminal is recovered into the state set by the system setting parameters. Then on this basis, new settings can be made and a new round of the data backup stage and the date recovery stage can be performed.

As a preferred embodiment, the method for backing up and recovering data according to the embodiment of the present disclosure further comprises a step of acquiring user identity information. The user identity information comprises user identity number (user ID) and a password. Specifically, the step of acquiring the user identity information comprises:

Before the backup request is received, the mobile terminal is enabled to transmit the user identity number and the password, so as to complete the user registration. Before the system setting parameters are backed up, the user connects the mobile terminal to the network server, inputs the user ID and the password, and transmits the user ID and the password to the network server via the mobile terminal. Then, the network server saves the user ID and the password to complete the user registration. The network server establishes a user database that corresponds to the user ID and the password so as to save the system setting parameters of the user. In this way, the system setting parameters of the user are bound together with the user account.

Before the recovery request is received, the identity number and the password of the user are received to complete the user login. Before the system setting parameters are recovered, the user inputs the user ID and the password via the mobile terminal, and then the mobile terminal transmits the user ID and the password to the network server. The network server matches the user ID and the password with the originally-saved user ID and password. If finding a corresponding user, the user login is completed; and otherwise, the login fails.

Figure 4:
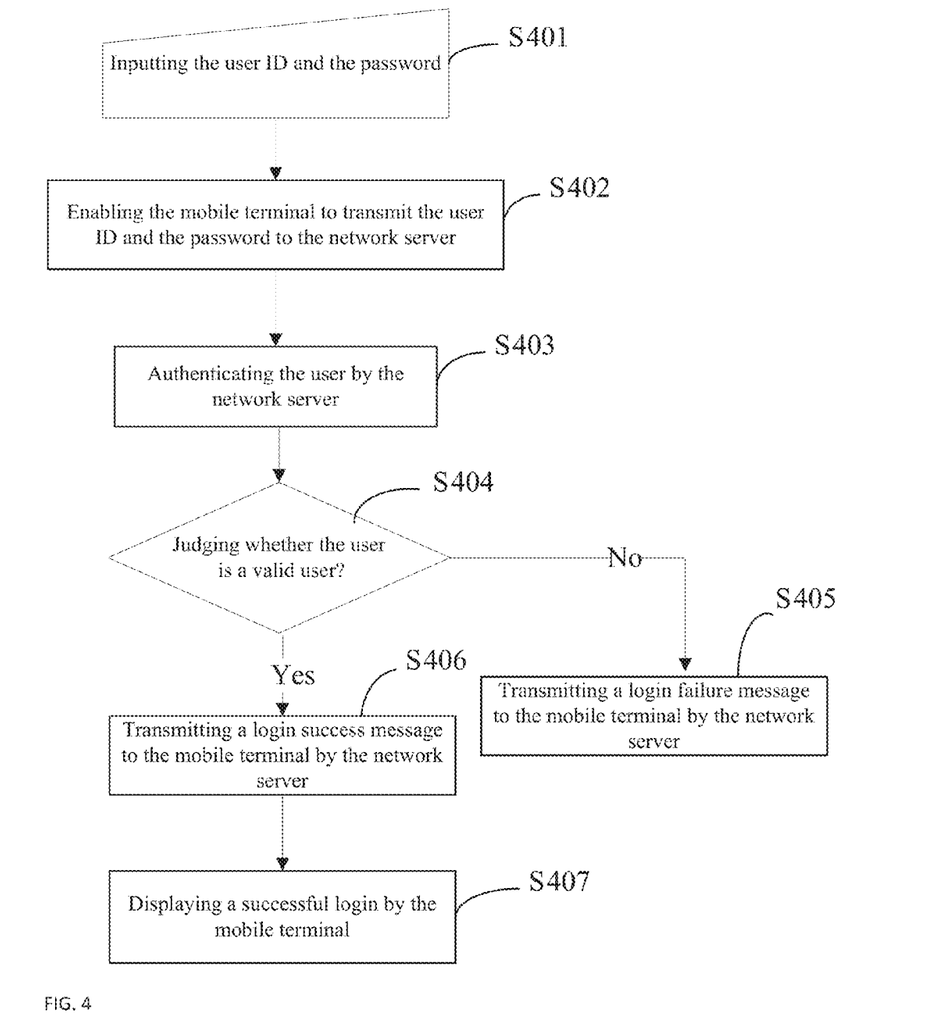
FIG. 4 is a flowchart diagram of user login in the embodiment of the method for data backup according to the present disclosure.

Please refer to FIG. 4, which is a flowchart diagram of the user login of this embodiment, which specifically comprises:

Step S401: inputting the user ID and the password.

The user ID and the password are input via the mobile terminal so that a user login instruction is sent out.

Step S402: enabling the mobile terminal to transmit the user ID and the password to the network server.

The mobile terminal transmits the user ID and the password that are acquired to the network server via the network.

Step S403: authenticating the user by the network server.

After receiving the user ID and the password, the network server compares the user ID and the password with the user information saved in the network server to finish the authentication.

Step S404: judging whether the user is a valid user.

The network server compares and matches the user ID and the password that are received with the user information saved in the network server. If corresponding user information is found, the user is judged as a valid user, and step S406 is executed; and if no corresponding user information is found, the user is judged as an invalid user, and step S405 is executed.

Step S405: transmitting a login failure message to the mobile terminal by the network server.

If the user trying to log in is not a valid user, the network server transmits the login failure message to the mobile terminal.

Step S406: transmitting a login success message to the mobile terminal by the network server.

If the user trying to log in is a valid user, the network server transmits the login success message to the mobile terminal.

Step S407: displaying a successful login by the mobile terminal.

After receiving the login success message transmitted from the network server, the mobile terminal displays that the login is successful. After the user successfully logs in, the user can perform any one of the operation for backing up the system setting parameters or the operation for recovering the system setting parameters. In this case, no matter whether the user is performing the operation for backing up the system setting parameters or the operation for recovering the system setting parameters, the change of system setting parameters is only made to the system state of the user that is currently logged in.

Figure 5:
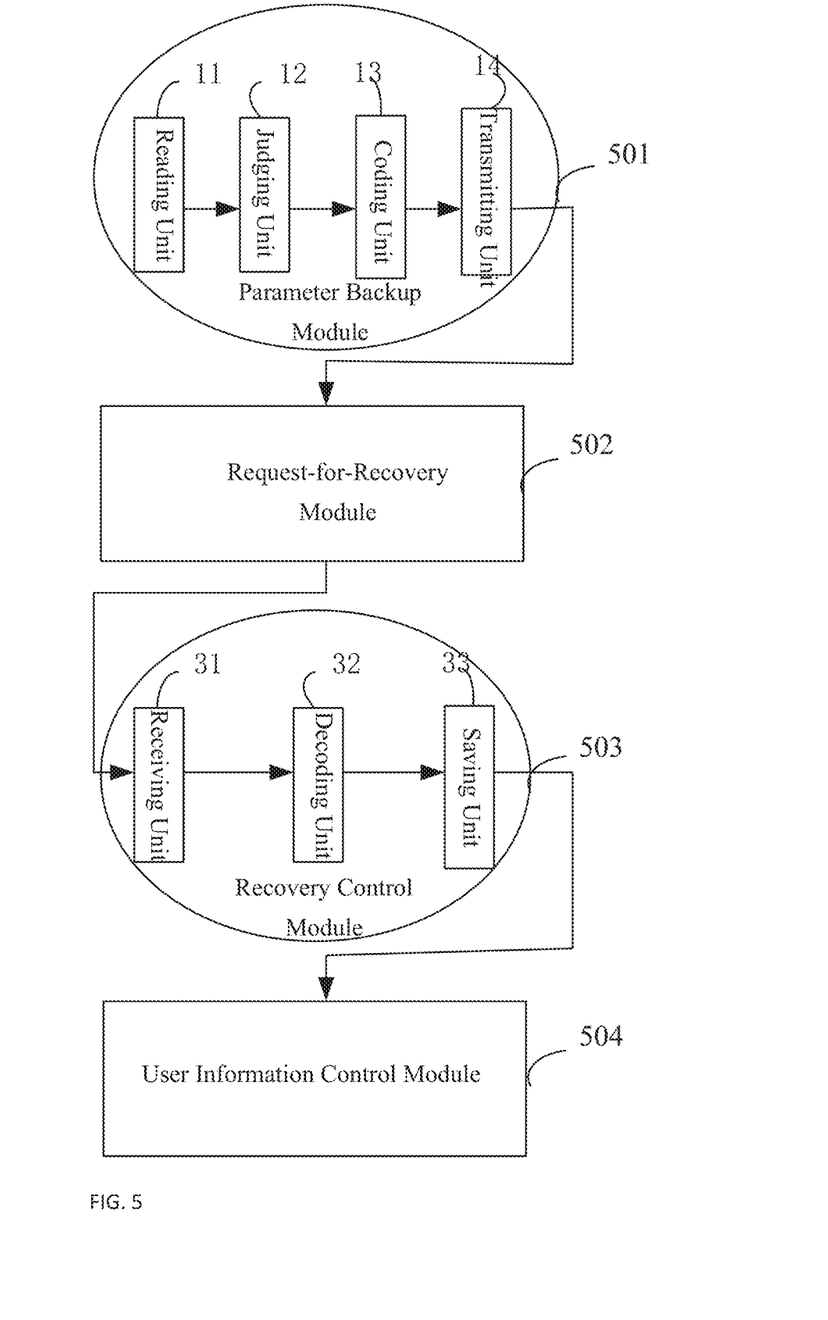
FIG. 5 is a functional block diagram of an embodiment of a mobile terminal according to the present disclosure.

Referring to FIG. 5, FIG. 5 is a functional block diagram of a mobile terminal according to an embodiment of the present disclosure. As shown in FIG. 5, the mobile terminal comprises:

A parameter backup module 501: is configured to receive a backup request for backing up system setting parameters, and transmit a compressed data packet of the system setting parameters to a network server according to the backup request, so that the system setting parameters are backed up by the network server.

When the user needs to back up the system setting parameters after performing the system setting operation, a backup request is transmitted via the parameter backup module 501. The parameter backup module 501 sorts and codes the system setting parameters according to the types of the setting items of the system setting parameters, compresses the system setting parameters into a TCP/IP data packet, and then transmits the date packet to the network server to finish backing up the system setting parameters.

A request-for-recovery module 502: is configured to receive a recovery request for recovering the system setting parameters to the mobile terminal and transmit the recovery request to the network server.

When the system setting parameters need to be recovered to the mobile terminal, the recovery request is transmitted to the network server via the request-for-recovery module 502.

A recovery control module 503: is configured to receive the TCP/IP data packet of the system setting parameters transmitted from the network server according to the recovery request, and control to recover a system state of the mobile terminal to a state that is set by the system setting parameters.

After receiving the recovery request from the mobile terminal, the network server finds the system setting parameters that are matched with the request user, and transmits the TCP/IP data packet of the system setting parameters to the mobile terminal via the network. The recovery control module 503 of the mobile terminal receives the TCP/IP data packet and decodes the data packet to obtain the system setting parameters comprising types and values of the setting items. The recovery control module 503 further controls the system setting according to the types of the setting items and saves the system setting parameters so that the system state of the mobile terminal is recovered into the state that is set by the system setting parameters.

Further, the mobile terminal of this embodiment of the present disclosure also comprises:

A user information control module 504: is configured to transmit the identity number and the password of the user before the backup request is received by the parameter backup module 501, to complete a user registration; and is also configured to receive the identity number and the password of the user before the recovery request is received by the request-for-recovery module 502, to complete a user login.

Before the backup request is received by the parameter backup module, the user information control module 504 transmits the identity number and the password of the user to complete the user registration, such that when the system setting parameters are backed up by the parameter backup module 501, the network server establishes a corresponding user database according to the user registration information so as to save the system setting parameters of the corresponding user.

Before the recovery request is received by the request-for-recovery 502, the user information control module 504 receives the user identity number and the password to complete the user login, such that when the system setting parameters are recovered by the recovery control module 503, the network server finds the system setting parameters of the user from the corresponding user database and transmits the system setting parameters to the mobile terminal so that the system settings of the mobile terminal are recovered into the state originally set by the request user.

The parameter backup module 501 of this embodiment further comprises:

A reading unit 11: is configured to read information of the system setting parameters one by one.

After transmitting the backup request, the mobile terminal reads the system setting parameters in the system respectively via the reading unit 11, including the volume, the type of the voice, or the like.

A judging unit 12: is configured to judge whether there is any setting item that has not been backed up among the information of the system setting parameters that are read.

The mobile terminal determines, among the information of the system setting parameters that are read, whether there is any setting item that has not been backed up via the judging unit 12. If there is setting items that have not been backed up, the mobile terminal sorts the system setting parameters of the setting items that have not been backed up according to the types of the setting items. If all of the setting items have been backed up, the backup ends up.

A coding unit 13: is configured to sort and code the system setting parameters that are read but have not been backed up and compress them into a data packet.

After sorting the system setting parameters that are read but have not been backed up, the mobile terminal codes the system setting parameters and compresses the system setting parameters into a TCP/IP data packet.

A transmitting unit 14: is configured to transmit the data packet to the network server.

The mobile terminal transmits the TCP/IP data packet to the network server via the transmitting unit 14.

The recovery control module 503 of this embodiment further comprises:

A receiving unit 31: is configured to receive the compressed data packet of the system setting parameters transmitted from the network server according to the recovery request.

The mobile terminal receives, via the receiving unit 31, the TCP/IP data packet of the system setting parameters transmitted from the network server according to the recovery request.

A decoding unit 32: is configured to decode the received data packet to obtain the system setting parameters comprising types and values of setting items.

The mobile terminal decodes, via the decoding unit 32, the TCP/IP data packet received from the network server to obtain the system setting parameters comprising the types and the values of the setting items.

A saving unit 33: is configured to perform a system setting operation according to the types of the setting items and save the system setting parameters.

The mobile terminal performs the system setting operation according to the types of the setting items and saves the system setting parameters via the saving unit 33.

Figure 6:
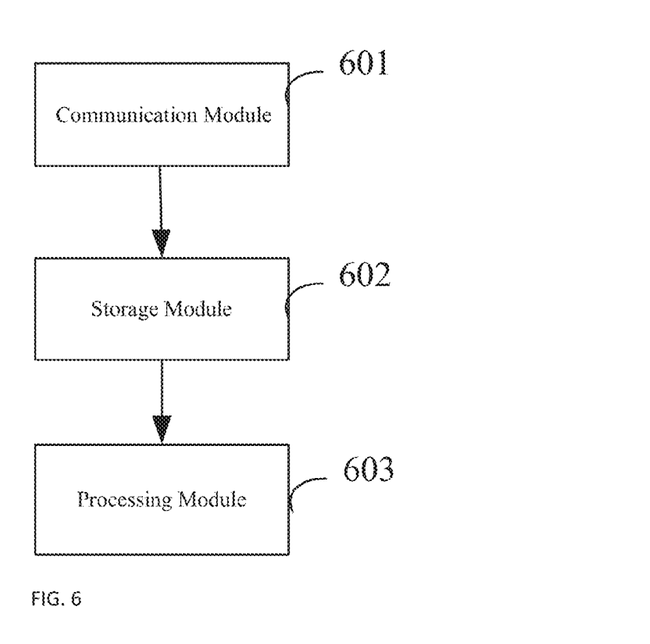
FIG. 6 is a functional block diagram of an embodiment of a server for data backup and recovery according to the present disclosure.

Referring to FIG. 6, FIG. 6 is a functional block diagram of an embodiment of a server for data backup and recovery according to the present disclosure. As shown in FIG. 6, the server comprises:

A communication module 601: is configured to acquire user identity information from the mobile terminal and establish a corresponding user database.

The server acquires the user identity information from the mobile terminal and establishes a user database corresponding to the user information via the communication module 601.

A storage module 602: is configured to store the user identity information and also store the system setting parameters transmitted from the mobile terminal according to the user identity information.

After acquiring the user identity information, the server stores the user identity information via the storage module 602. Meanwhile, during the backup or recovery process, the server stores the system setting parameters of the user into the corresponding user database according to the user information via the storage module 602.

A processing module 603: is configured to identify the backup/recovery requests from the mobile terminal and process the system setting parameters according to the backup/recovery request.

Specifically, processing the system setting parameters by the processing module 603 of the server comprises: firstly judging whether the request is a backup request or a recovery request after a request from the mobile terminal is received; if the request is a backup request, finding the corresponding user database according to the user information and saving the compressed data packet of the system setting parameters transmitted from the user according to the backup request into the database of the user so as to finish backing up the system setting parameters of the user; if the request is a recovery request, judging whether the request user is a valid user; if the user is a valid user, finding the system setting parameters in the database of the user by matching and then transmitting the compressed data packet of the system setting parameters to the mobile terminal via the network to enable the mobile terminal to finish recovering the system setting parameters; and if the user is not a valid user, enabling the mobile terminal to end up the recovery stage for the system setting parameters.

Figure 7:
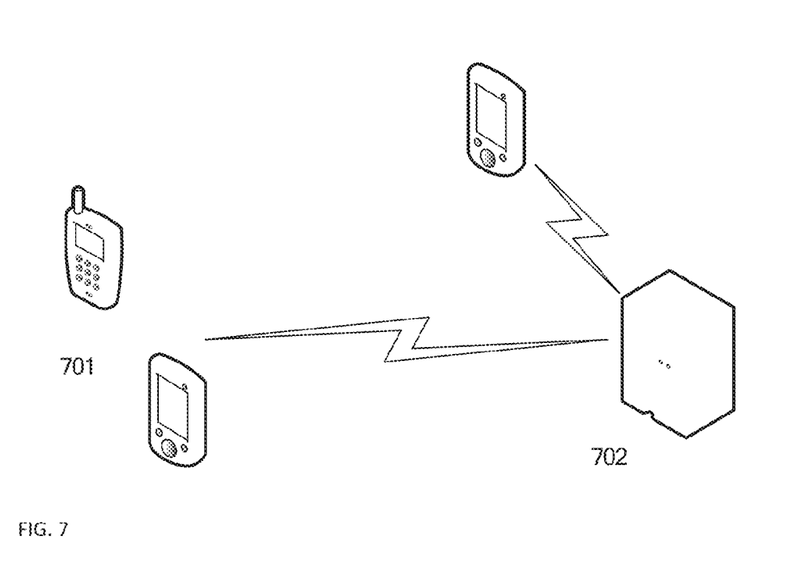
FIG. 7 is a functional block diagram of an embodiment of a system for data backup and recovery according to the present disclosure.

Referring to FIG. 7, FIG. 7 shows an embodiment of a system for data backup and recovery according to the present disclosure. The system comprises a mobile terminal 701 and a server 702.

The mobile terminal 701 may be any one of the mobile terminals of the aforesaid embodiments, and the server 702 may be any one of the servers of the aforesaid embodiments. The mobile terminal 701 and the server 702 communicate with each other via the network.

The network acts as a communication bridge between the mobile terminal 701 and the server 702. The mobile terminal 701 and the server 702 communicate with each other via the network to transmit and send data.

As can be known from description of the aforesaid embodiments, the present disclosure has the following advantageous over the prior art: by backing up the system setting parameters of the mobile terminal to the server and by recovering the system setting parameters from the server to the mobile terminal when recovering the data, it can avoid the troubles caused by losing the system setting parameters because of replacing the mobile terminal or upgrading the mobile terminal and resetting the system setting parameters. Thus, it is very convenient for the user and brings a new experience to the user.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall ail be covered within the scope of the present disclosure.

What is claimed is:

1. A system for backing up and recovering data, the system comprising a mobile terminal and a server, wherein:
   the mobile terminal comprises:
   a parameter backup module, being configured to receive a backup request for backing up system setting parameters of the mobile terminal, and enable the mobile terminal to transmit the system setting parameters to a network server according to the backup request so that the system setting parameters are backed up by the network server;
   a request-for-recovery module, being configured to receive a recovery request for recovering the system setting parameters to the mobile terminal and enable the mobile terminal to transmit the recovery request to the network server;
   a recovery control module, being configured to receive the system setting parameters that are transmitted by the network server according to the recovery request and control to recover a system state of the mobile terminal to a state that is set by the system setting parameters,
   wherein
   the parameter backup module comprises:
   a reading unit, being configured to receive the backup request for backing up the system setting parameters and read information of the system setting parameters one by one according to the backup request;
   a judging unit, being configured to judge whether there is any setting item that has not been backed up among the information of the system setting parameters that are read;
   a coding unit, being configured to sort and code the system setting parameters that are read but have not been backed up and compress them into a data packet;
   a transmitting unit, being configured to transmit the data packet to the network server;
   the recovery control module comprises:
   a receiving unit, being configured to receive the compressed data packet of the system setting parameters transmitted from the network server according to the recovery request;
   a decoding unit, being configured to decode the received data packet to obtain the system setting parameters comprising types and values of setting items; and
   a saving unit, being configured to perform a system setting operation according to the types of the setting items and save the system setting parameters; and
   the server comprises:
   a communication module, being configured to acquire user identity information from the mobile terminal and establish a corresponding user database;
   a storage module, being configured to store the user identity information and also store the system setting parameters transmitted from the mobile terminal according to the user identity information; and
   a processing module, being configured to identify the backup/recovery request from the mobile terminal and process the system setting parameters according to the backup/recovery request.

2. A mobile terminal, wherein the mobile terminal comprises:
   a parameter backup module, being configured to receive a backup request for backing up system setting parameters and transmit a compressed data packet of the system setting parameters to a network server according to the backup request, so that the system setting parameters are backed up by the network server;
   a request-for-recovery module, being configured to receive a recovery request for recovering the system setting parameters to the mobile terminal and transmit the recovery request to the network server; and
   a recovery control module, being configured to receive the compressed data packet of the system setting parameters transmitted by the network server according to the recovery request and control to recover a system state of the mobile terminal to a state set by the system setting parameters;
   wherein the parameter backup module comprises:
   a reading unit, being configured to receive the backup request for backing up the system setting parameters and read information of the system setting parameters one by one according to the backup request;
   a judging unit, being configured to judge whether there is any setting item that has not been backed up among the information of the system setting parameters that are read;
   a coding unit, being configured to sort and code the system setting parameters that are read but have not been backed up and compress them into a data packet; and
   a transmitting unit, being configured to transmit the data packet to the network server.

3. The mobile terminal of claim 2, wherein the recovery control module comprises:
   a receiving unit, being configured to receive the compressed data packet of the system setting parameters transmitted from the network server according to the recovery request;
   a decoding unit, being configured to decode the received data packet to obtain the system setting parameters comprising types and values of setting items; and
   a saving unit, being configured to perform a system setting operation according to the types of the setting items and save the system setting parameters.

4. The mobile terminal of claim 2, wherein the mobile terminal further comprises:
   a user information control module, being configured to transmit an identity number and a password of the user before the backup request is received by the parameter backup module, so as to complete a user registration; and further being configured to receive the identity number and the password of the user before the recovery request is received by the request-for-recovery module, so as to complete a user login.

5. A mobile terminal, wherein the mobile terminal comprises:
   a parameter backup module, being configured to receive a backup request for backing up system setting parameters and transmit a compressed data packet of the system setting parameters to a network server according to the backup request, so that the system setting parameters are backed up by the network server;
   a request-for-recovery module, being configured to receive a recovery request for recovering the system setting parameters to the mobile terminal and transmit the recovery request to the network server; and a recovery control module, being configured to receive the compressed data packet of the system setting parameters transmitted by the network server according to the recovery request and control to recover a system state of the mobile terminal to a state set by the system setting parameters;

wherein the recovery control module comprises:

a receiving unit, being configured to receive the compressed data packet of the system setting parameters transmitted from the network server according to the recovery request;

a decoding unit, being configured to decode the received data packet to obtain the system setting parameters comprising types and values of setting items; and a saving unit, being configured to perform a system setting operation according to the types of the setting items and save the system setting parameters.

6. The mobile terminal of claim 5, wherein the mobile terminal further comprises:

a user information control module, being configured to transmit an identity number and a password of the user before the backup request is received by the parameter backup module, so as to complete a user registration; and further being configured to receive the identity number and the password of the user before the recovery request is received by the request-for-recovery module, so as to complete a user login.

* * * * *